US 011029986B2

(12) United States Patent
Sherwin, Jr.

(10) Patent No.: US 11,029,986 B2
(45) Date of Patent: Jun. 8, 2021

(54) PROCESSOR FEATURE ID RESPONSE FOR VIRTUALIZATION

(71) Applicant: Microsoft Technology Licensing, LLC, Redmond, WA (US)

(72) Inventor: Bruce J. Sherwin, Jr., Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 217 days.

(21) Appl. No.: 15/990,310

(22) Filed: May 25, 2018

(65) Prior Publication Data
US 2019/0361723 A1    Nov. 28, 2019

(51) Int. Cl.
*G06F 9/455* (2018.01)

(52) U.S. Cl.
CPC .............. *G06F 9/45545* (2013.01)

(58) Field of Classification Search
CPC .................................. G06F 9/45545
See application file for complete search history.

(56) References Cited

U.S. PATENT DOCUMENTS

| 2012/0084777 A1* | 4/2012 | Jayamohan | G06F 9/5044 718/1 |
| 2013/0232490 A1* | 9/2013 | Moriki | G06F 9/463 718/1 |
| 2015/0082305 A1* | 3/2015 | Hepkin | G06F 9/45558 718/1 |
| 2016/0147555 A1 | 5/2016 | Hepkin | |
| 2016/0359680 A1* | 12/2016 | Parandehgheibi | G06F 16/235 |

OTHER PUBLICATIONS

"ARM architecture", Retrieved from: http://infocenter.arm.com/help/index.jsp?topic=/com.arm.doc.subset.architecture.reference/index.html, Sep. 6, 2015, 2 Pages.
"Developer Guides, Manuals & ISA Documents", Retrieved from: https://developer.amd.com/resources/developer-guides-manuals/, Dec. 17, 2017, 6 Pages.
"Intel® 64 and IA-32 Architectures Software Developer Manuals", Retrieved from: https://software.intel.com/en-us/articles/intel-sdm, Oct. 12, 2016, 17 Pages.
"International Search Report and Written Opinion Issued in PCT Application No. PCT/US2019/031930", dated Jul. 22, 2019, 12 Pages.

* cited by examiner

*Primary Examiner* — Jacob D Dascomb
(74) *Attorney, Agent, or Firm* — Davin Chin; Chin IP, PLLC

(57) ABSTRACT

The disclosed technology is generally directed to virtualization technology. The disclosed technology includes providing processor feature ID information requested by, or from, a virtual machine (VM), virtualized application, Virtualization Based Security (VBS) user mode process, VBS kernel mode process, or other guest partition, by a processor. Such information may be provided based on information provided a priori to the processor, for example, by a supervisory partition, such as a hypervisor. The disclosed technology also includes a supervisory partition, for example, that provides such information to the processor, and includes guest partitions that receive such information.

20 Claims, 5 Drawing Sheets

PROCESSOR FEATURE ID RESPONSE FOR VIRTUALIZATION

BACKGROUND

Virtualization technology is employed in a wide variety of contexts. For example, virtualization technology may be employed to abstract physical computing resources from guest partitions, to enable higher utilization of the physical computing resources, to enable portability of guest partitions across physical devices, to protect the physical computing resources from malicious and/or erroneous code running in guest partitions, to protect secrets, to enforce security requirements or policy, and/or the like. In prior virtualization technology, a guest exit (e.g., a transfer of control of a processor from the guest partition to a supervisory partition, such as a hypervisor) may occur in response to certain operations. For example, a guest exit may occur in response to a request for processor feature ID information.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to virtualization technology. The disclosed technology includes providing processor feature ID information requested by, or from, a virtual machine (VM), virtualized application, Virtualization Based Security (VBS) user mode process, VBS kernel mode process, or other guest partition, by a processor. Such information may be provided based on information provided a priori to the processor, for example, by a supervisory partition, such as a hypervisor. The disclosed technology also includes a supervisory partition, for example, that provides such information to the processor, and includes guest partitions that receive such information.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
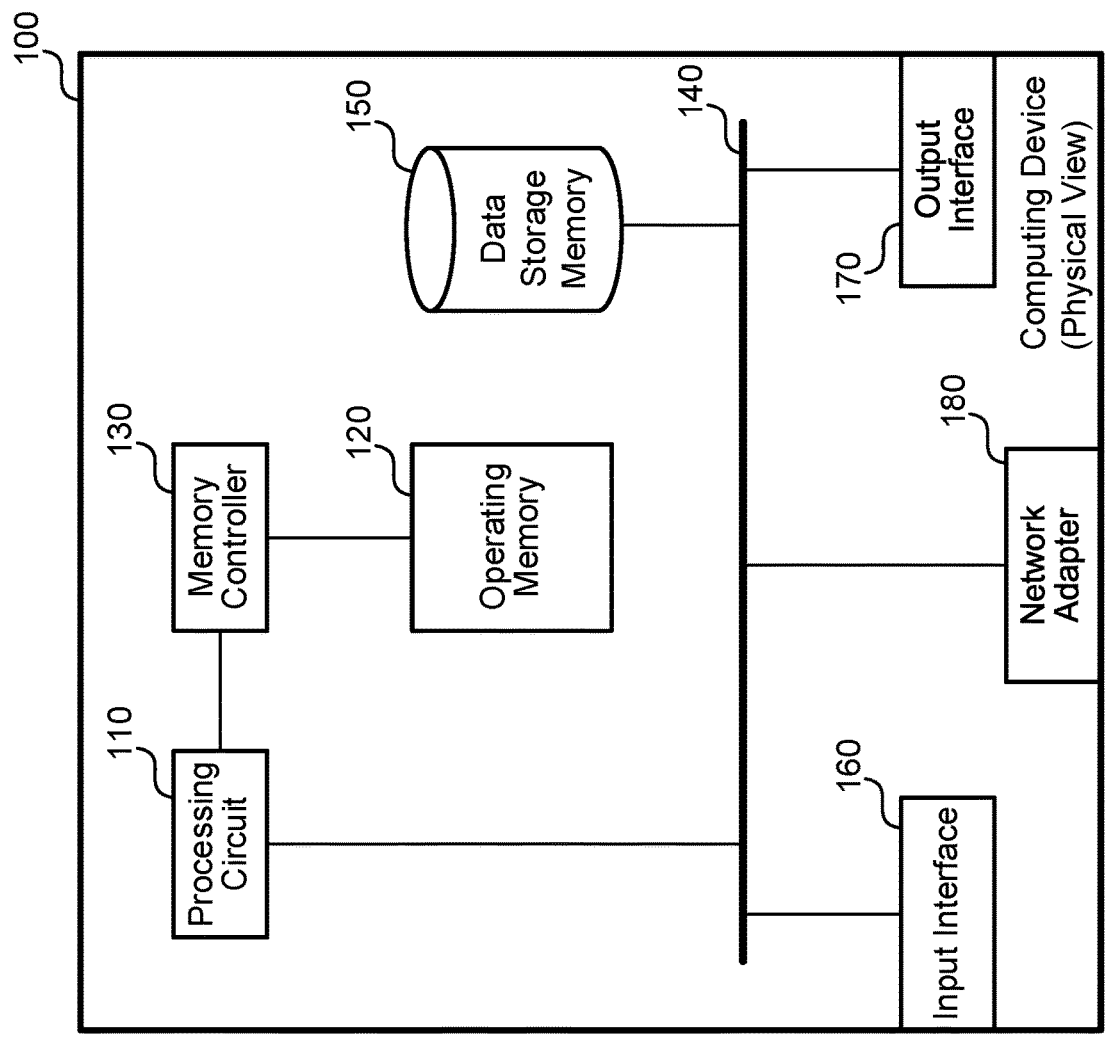
FIG. 1 is a block diagram illustrating a physical view of one example of a suitable computing device according to aspects of the disclosed technology.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to virtualization technology. The disclosed technology includes providing processor feature ID information requested by, or from, a virtual machine (VM), virtualized application, Virtualization Based Security (VBS) user mode process, VBS kernel mode process, or other guest partition, by a processor. For example, such requests may be generated by code executing on a guest virtual processor within a guest partition. Such information may be provided based on information provided a priori to the processor, for example, by a supervisory partition, such as a hypervisor. The disclosed technology also includes a supervisory partition, for example, that provides such information to the processor, and includes guest partitions that receive such information.

In some examples, the disclosed technology may be employed in virtualization/virtualized systems. For example, the technology may be employed in conjunction with hypervisors, virtual machines, virtualized applications, Virtualization Based Security (VBS) user mode processes, VBS kernel mode processes, and/or the like. For example, the technology may include precomputing or otherwise determining processor feature ID information by a hypervisor or other supervisory partition, and providing the determined processor feature ID information to a processor of a computing device for later use in responding to requests for the processor feature ID information, e.g., from a guest partition. For example, requests for such information from a guest partition can then be handled by the processor without intervention of the supervisory partition.

Use of the disclosed technology may be employed to reduce and/or eliminate the frequency of VM exits or other guest exits in which a system exits from execution of guest code in order to execute supervisory partition code. As one example of a guest exit, in response to a guest's query for processor feature ID information, a supervisory partition process may take control of the processor from the guest partition, set up processor feature ID registers of the processor, then return control of the processor to the guest partition.

In certain prior virtualization systems, guest exits occur in response to certain operations being executed from a guest partition. For example, a guest exit may occur in response to operation being executed from the guest partition in which a CPU ID or other processor feature ID information is requested. Such exits are typically "expensive" in terms of time, power, and computing performance. For example, guest exits may be associated with use of processing bandwidth for supervisory partition code (e.g., overhead) rather than guest partition code (e.g., the intended workload). Guest exits may also be associated with additional context switching overhead due to over writing of processor data and/or instruction cache locations with supervisory partition code, and/or the like.

Illustrative Physical Computing Device

FIG. 1 is a diagram illustrating one example of a physical view of computing device 100 in which aspects of the technology may be practiced. Computing device 100 may be virtually any type of general- or specific-purpose computing device. For example, computing device 100 may be a user device such as a desktop computer, a laptop computer, a tablet computer, a display device, a camera, a printer, or a smartphone. Likewise, computing device 100 may also be server device such as an application server computer, a virtual computing host computer, or a file server computer. Computing device 100 may also be an IoT device that connects to a network to receive IoT services. Likewise, computer device 100 may be an example any of the devices illustrated in or referred to in FIGS. 2-5, as discussed in greater detail below. As illustrated in FIG. 1, computing device 100 includes processing circuit 110, operating memory 120, memory controller 130, data storage memory 150, input interface 160, output interface 170, and network adapter 180. Each of these afore-listed components of computing device 100 includes at least one hardware element.

Computing device 100 includes at least one processing circuit 110 configured to execute instructions, such as instructions for implementing the herein-described workloads, processes, or technology. Processing circuit 110 may include a microprocessor, a microcontroller, a graphics processor, a coprocessor, a field-programmable gate array, a programmable logic device, a signal processor, or any other circuit suitable for processing data. Processing circuit 110 is an example of a core. The aforementioned instructions, along with other data (e.g., datasets, metadata, operating system instructions, etc.), may be stored in operating memory 120 during run-time of computing device 100. Operating memory 120 may also include any of a variety of data storage devices/components, such as volatile memories, semi-volatile memories, random access memories, static memories, caches, buffers, or other media used to store run-time information. In one example, operating memory 120 does not retain information when computing device 100 is powered off. Rather, computing device 100 may be configured to transfer instructions from a non-volatile data storage component (e.g., data storage component 150) to operating memory 120 as part of a booting or other loading process.

Operating memory 120 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 110 via memory controller 130 in channels. One example of computing device 100 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 120 specifically does not include or encompass communications media, any communications medium, or any signals per se.

Memory controller 130 is configured to interface processing circuit 110 to operating memory 120. For example, memory controller 130 may be configured to interface commands, addresses, and data between operating memory 120 and processing circuit 110. Memory controller 130 may also be configured to abstract or otherwise manage certain aspects of memory management from or for processing circuit 110. Although memory controller 130 is illustrated as single memory controller separate from processing circuit 110, in other examples, multiple memory controllers may be employed, memory controller(s) may be integrated with operating memory 120, or the like. Further, memory controller(s) may be integrated into processing circuit 110. These and other variations are possible.

In computing device 100, data storage memory 150, input interface 160, output interface 170, and network adapter 180 are interfaced to processing circuit 110 by bus 140. Although, FIG. 1 illustrates bus 140 as a single passive bus, other configurations, such as a collection of buses, a collection of point to point links, an input/output controller, a bridge, other interface circuitry, or any collection thereof may also be suitably employed for interfacing data storage memory 150, input interface 160, output interface 170, or network adapter 180 to processing circuit 110.

In computing device 100, data storage memory 150 is employed for long-term non-volatile data storage. Data storage memory 150 may include any of a variety of non-volatile data storage devices/components, such as non-volatile memories, disks, disk drives, hard drives, solid-state drives, or any other media that can be used for the non-volatile storage of information. However, data storage memory 150 specifically does not include or encompass communications media, any communications medium, or any signals per se. In contrast to operating memory 120, data storage memory 150 is employed by computing device 100 for non-volatile long-term data storage, instead of for run-time data storage.

Also, computing device 100 may include or be coupled to any type of processor-readable media such as processor-readable storage media (e.g., operating memory 120 and data storage memory 150) and communication media (e.g., communication signals and radio waves). While the term processor-readable storage media includes operating memory 120 and data storage memory 150, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 100 also includes input interface 160, which may be configured to enable computing device 100 to receive input from users or from other devices. In addition, computing device 100 includes output interface 170, which may be configured to provide output from computing device 100. In one example, output interface 170 includes a frame buffer, graphics processor, graphics processor or accelerator, and is configured to render displays for presentation on a separate visual display device (such as a monitor, projector, virtual computing client computer, etc.). In another example, output interface 170 includes a visual display device and is configured to render and present displays for viewing. In yet another example, input interface 160 and/or output interface 170 may include a universal asynchronous receiver/transmitter ("UART"), a Serial Peripheral Interface ("SPI"), Inter-Integrated Circuit ("I1C"), a General-purpose input/output (GPIO), and/or the like. Moreover, input interface 160 and/or output interface 170 may include or be interfaced to any number or type of peripherals.

In the illustrated example, computing device 100 is configured to communicate with other computing devices or entities via network adapter 180. Network adapter 180 may include a wired network adapter, e.g., an Ethernet adapter, a Token Ring adapter, or a Digital Subscriber Line (DSL) adapter. Network adapter 180 may also include a wireless network adapter, for example, a Wi-Fi adapter, a Bluetooth adapter, a ZigBee adapter, a Long Term Evolution (LTE) adapter, or a 5G adapter.

Although computing device 100 is illustrated with certain components configured in a particular arrangement, these components and arrangement are merely one example of a computing device in which the technology may be employed. In other examples, data storage memory 150, input interface 160, output interface 170, or network adapter 180 may be directly coupled to processing circuit 110, or be coupled to processing circuit 110 via an input/output controller, a bridge, or other interface circuitry. Other variations of the technology are possible.

Some examples of computing device 100 include at least one memory (e.g., operating memory 120) adapted to store run-time data and at least one processor (e.g., processing unit 110) that is adapted to execute processor-executable code that, in response to execution, enables computing device 100 to perform actions.

Illustrative Logical Computing Device

Figure 2:
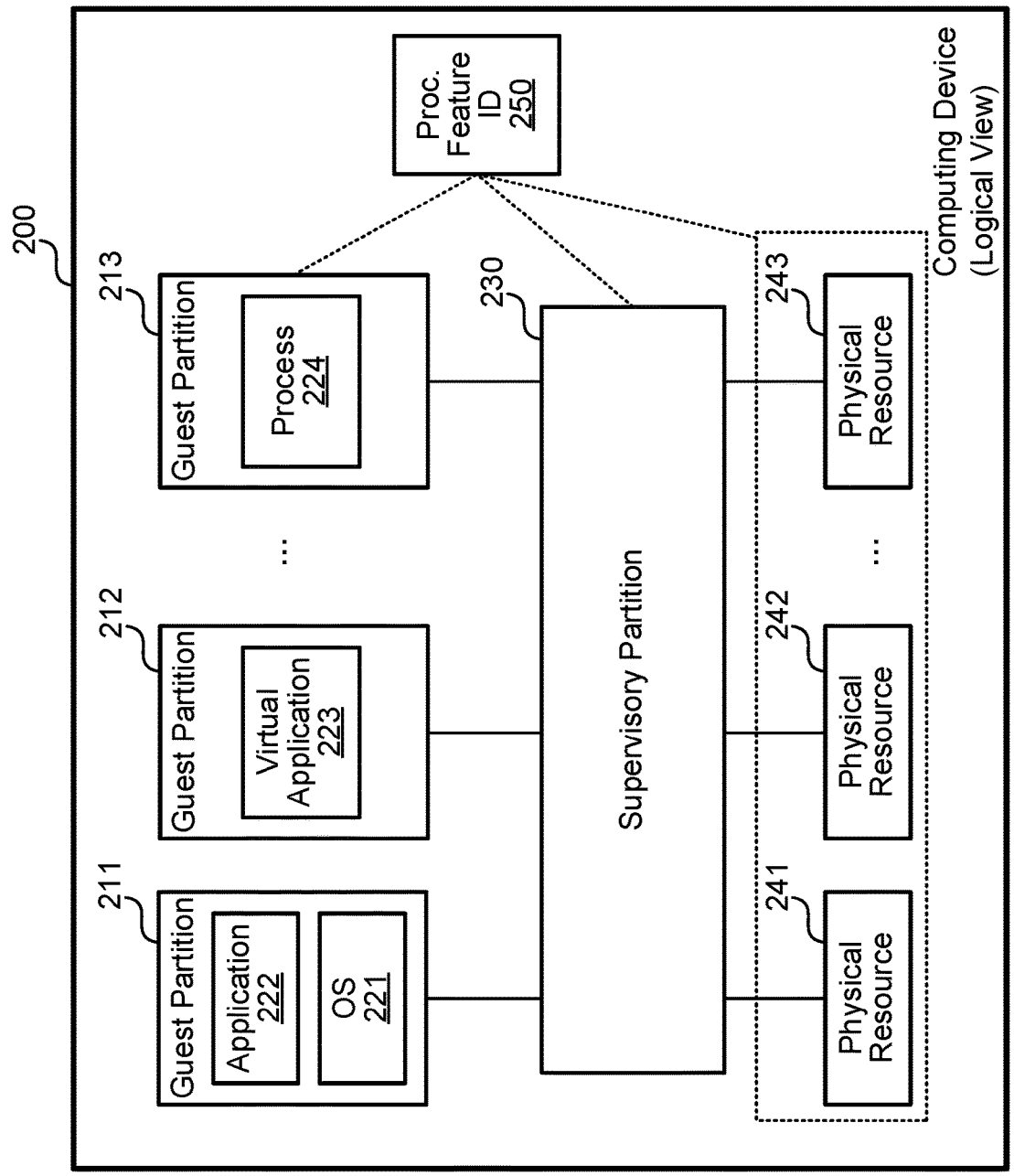
FIG. 2 is a block diagram illustrating a logical view of the example computing device according to aspects of the disclosed technology.

FIG. 2 is a diagram illustrating one example of a logical view of computing device 200 in which aspects of the technology may be practiced. Computing device 200 may be an example of computing device 100 of FIG. 1. In the illustration of FIG. 2, the logical components of computing device 200 include guest partitions 211-213, supervisory partition 230, physical resources 241-243, and processor feature ID 250.

Physical resources 241-243 may include any variety of physical components, such as processor components, input/output (I/O) components, and/or other components or devices. For example, physical resources 241-243 may include any suitable combination of physical components, such as those discussed in conjunction with FIG. 1. Although illustrated as part of computing device 200, one or more of physical resources 241-243 (e.g., one or more data storage memories) can be implemented external to computing device 200. Various components or modules running on computing device 200, including supervisory partition 230, may access functionality(-ies) provided via physical resources 241-243 directly and/or indirectly via other components or modules.

Supervisory partition 230 may generate any number of guest partitions, e.g., guest partitions 211-213. Each of guest partitions 211-213 may be a VM, a virtualized application, a VBS execution environment, user mode process, and/or the like. For example, guest partition 211 is illustrated as a VM with operating system (OS) 221 and application 222, guest partition 212 is illustrated as a virtualized application 223, and guest partition 224 is illustrated as having process 224 executing therefrom.

Each of guest partitions 211-213 is a logical unit of isolation from which an operating system and/or other software executes. Each of guest partitions 211-213 may also include a guest virtual processor. The software executing within each of guest partitions 211-213 is isolated from the software executing in each of the other of guest partitions. E.g., the software executing in each of guest partitions 211-213 is not able to access, and need not be aware of, the software executing in each of the other guest partitions. Physical resources 241-243 are virtualized to guest partitions 211-213, and access to physical resources 241-243 is managed by supervisory partition 230.

As illustrated, computing device 100 includes supervisory partition 230. Supervisory partition 230, may include hypervisor such as a virtual machine monitor that manages access to the functionality provided by physical resources 241-243. In another example, supervisory partition 230 is kernel or kernel mode process of an OS, such as an OS that employs VBS.

Computing device 200 also includes one or more processor feature ID 250. For example, processor feature ID 250 may represent a physical hardware ID register (or set of registers) of a physical processor, such as a register (or set of registers) containing x86 CPU ID leaf information, ID registers for an Advanced Reduced Instruction Set Computing Machine (ARM) processor, and/or the like. Processor feature ID 250 may also represent a feature supported by a processor, a feature set supported by the processor, a physical characteristic of the processor, and/or the like. For example, processor feature ID 250 may represent a processor frequency, a supported physical address width, a clock multiplier, a power setting, availability of an instruction, a stepping number, a serial number, and/or the like.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 3:
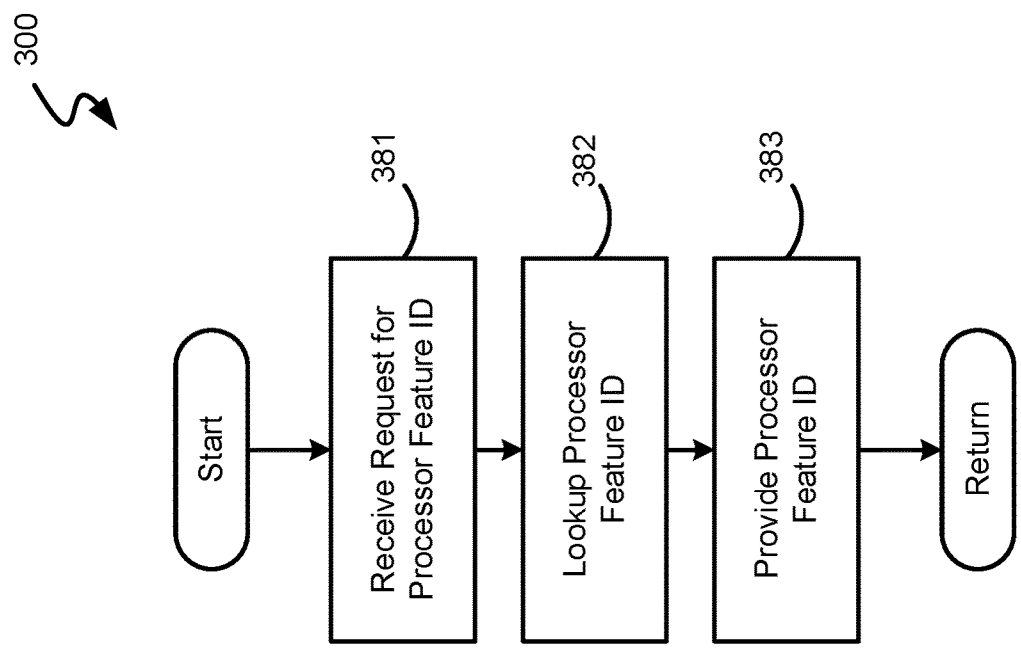
FIG. 3 illustrates an example process according to aspects of the disclosed technology.

FIG. 3 illustrates example process 300 which is illustrated from the viewpoint of a processor of a computing device, e.g., processing circuit 110 of FIG. 1 or physical resource 241, 242, or 243 of FIG. 2. Process 300 starts at 381 where a request for a processor feature ID is received. For example, this request may be received by a physical processor, and this request may have originated from a guest partition. For example, this request may be generated by code executing on a guest virtual processor within a guest partition.

From 381, processing flows to 382 where, for example, the processor looks up the processor feature ID. In one example, the processor looks up the processor feature ID from a processor feature ID register, from a memory structure accessible to the processor, from a processor feature ID lookup table, and/or the like. This look up may also be based on information that was provided a priori to the processor by a hypervisor or other supervisory partition, e.g., as further discussed in conjunction with process 400 of FIG. 4.

Processing then flows to 383 where the processor feature ID is provided, e.g., without a guest exit. This may include the processor providing the requested processor feature ID to the guest partition, such as to a requesting process from the guest partition. The provided processor feature ID may be based on the information that was provided a priori to the processor. Following 383, processing returns to other operations.

Figure 4:
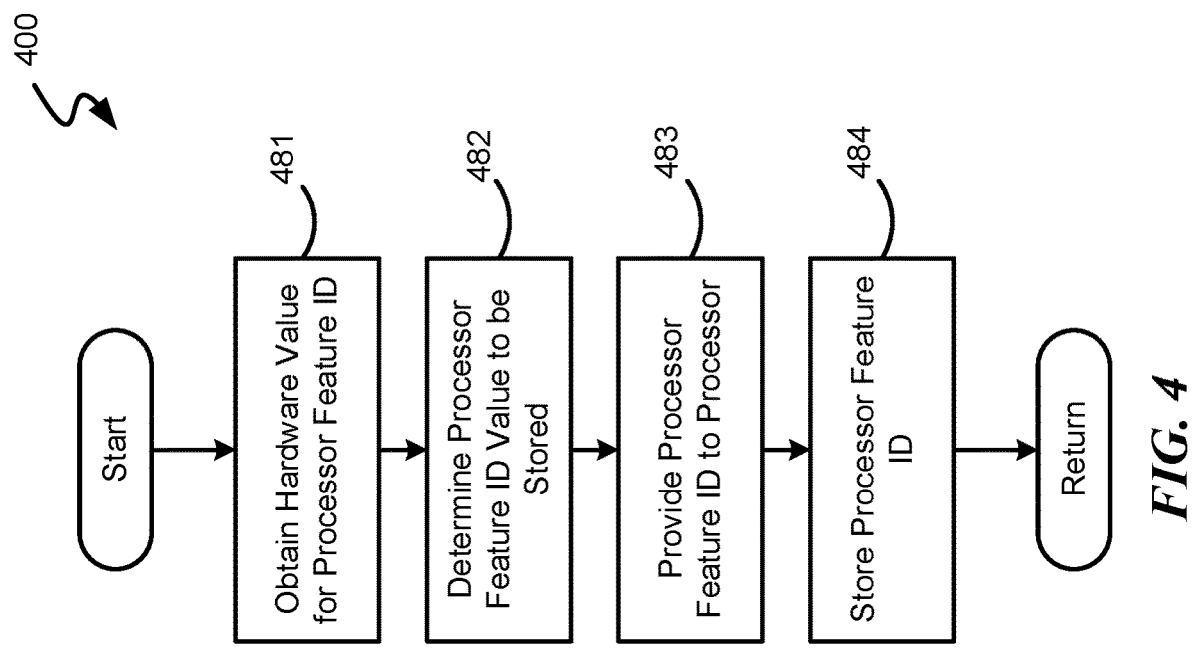
FIG. 4 illustrates another example process according to additional aspects of the disclosed technology.

FIG. 4 illustrates example process 400 which is illustrated from the viewpoint of a supervisory partition, e.g., a hypervisor. For example, process 400 is illustrated from the viewpoint of supervisory partition 230 of FIG. 2.

Process 400 starts at 481 where a value for a processor feature ID is obtained. This value may be obtained by the supervisory partition in conjunction with, or in response to, a setup operation for at least one of a guest partition, guest virtual processor, or guest virtual processor virtual trust level. For example, such setup operation may include at least one of a generation, instantiation, or startup of the guest partition, guest virtual processor, or guest virtual processor virtual trust level. The value may be obtained, for example, by reading a corresponding hardware register value of a physical processor of the computing device. As one example, the obtained processor feature ID value may be a value assigned by a manufacturer of the physical processor (e.g., an on-chip value), and/or be representative and or indicative of a feature/feature set supported by the processor.

Processing optionally flows to 482 where the processor feature ID that is to be stored is calculated or otherwise determined. For example, 482 may include determining whether the obtained processor function ID value is to be stored without change, or whether a different value is to be stored. For example, a different value may be stored if the supervisory partition is to "offer" a different set of processor features to the guest partition than natively supported by the processor, e.g., for enhanced guest partition portability, performance, and/or other reasons. At 482, multiple values for an obtained processor function ID value may also be determined, e.g., each associated with and/or specified for a different guest partition and/or guest virtual processor and/or trust level contexts. In some examples, different processor function ID values may be employed on a per virtual processor context or virtual processor's virtual trust level context. Examples of a per virtual processor context or virtual processor's virtual trust level context are the Virtual Machine Control Structure (VMCS), Virtual Machine Control Block (VMCB), a set of system registers containing guest context, or other virtualization instruction-set-architecture-specific collection of guest context.

Processing flows to 483 where the processor feature ID of 482 is provided to the processor. For example, the supervisory partition may provide the processor feature ID determined at 482 to the processor for later use by the processor in responding to requests from guest partition software for processor feature ID information. At 483, the processor may also receive this processor feature ID information from the supervisory partition.

Processing then flows to 484. At 484, the provided processor feature ID is stored. For example, 484 may include actions by the supervisory process that cause the processor to store the provided processor feature ID and/or actions undertaken by the processor to perform the storage. For example, this storage may include storing the processor feature ID in a processor feature ID register, in a processor feature ID lookup table in memory, and/or the like. In yet another example, the supervisory partition code may store the processor feature ID through a processor interface instruction, such as an ID_REGISTER_WRITE instruction.

In yet another example, the processor feature ID may be written to a memory structure accessible to the processor, and the location of that memory structure programed to a processor register. In this and other examples, multiple memory structures may be employed, e.g., to enable use of different processor function ID values for different guest partitions, for different VMCSs, virtual processor contexts, trust level contexts, and/or the like. In use, context switching between the different memory structures could be performed by either the processor or by supervisory partition code 230, e.g., in response to control of the processor switching from one guest partition, guest virtual processor, or guest virtual processor virtual trust level to another.

Optionally, 484 may also include storing conditional expressions to the processor that direct the processor to the appropriate value/memory structure of multiple values/memory structures for a given request from a guest partition. For example, an expression may be stored via an instruction such as an ID_REGISTER_WRITE(VP_CONTEXT, REGISTER_NAME, CONDITIONAL, VALUE) instruction.

As discussed above, this storage may also enable subsequent use, by the processor, of the processor feature ID to respond to requests from a guest partition without causing a guest exit. Process 400 may be repeated for additional processor function IDs, or multiple processor function IDs may be obtained, determined, provided, and stored in a single iteration of process 400. Following 484, processing returns to other operations.

Figure 5:
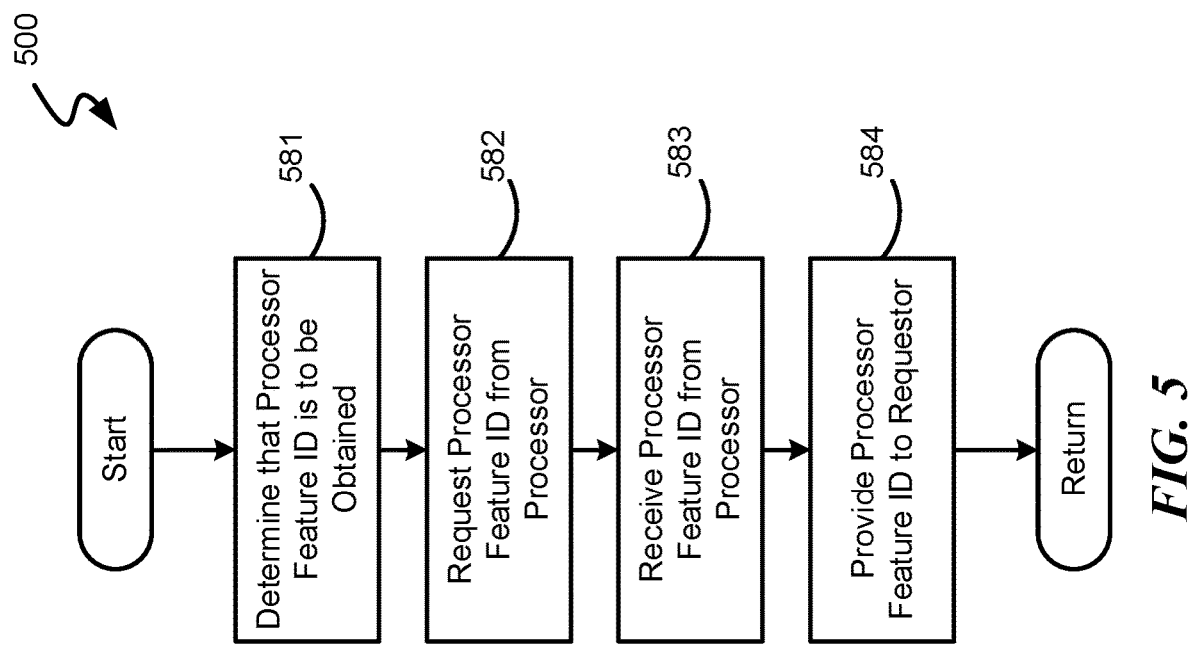
FIG. 5 illustrates yet another example process according to other aspects of the disclosed technology.

FIG. 5 illustrates an example process 500 which is illustrated from the viewpoint of a guest partition, e.g., guest partition 211, 212, or 213 of FIG. 2. Process 500 starts at 581 where a determination is made that a processor feature ID is to be obtained. For example, this determination may be made by or on a guest partition in response to a request for processor feature ID information from an application or other process executing from the guest partition. As another example, this determination may represent a request by a virtual machine that the processor feature ID is to be obtained for use by the virtual machine.

Processing then flows to 582 where a request for the processor feature ID is sent from the guest partition. This request may be sent to the processor. In response to the request of 582, at 583 the processor feature ID may be received from the processor. As discussed above, the received processor feature ID may be in accordance with information that was provided a priori to the processor by the supervisory partition. From 583, processing may flow to 584 where the received processor feature ID is provided to the requestor, e.g., the application or other process on the guest partition. Following 584, processing returns to other operations.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. A method for supporting virtualization, comprising:
prior to receiving, by a physical processor, a request originated from a guest partition for a processor feature ID value:
receiving, by the physical processor, a processor feature ID value from the supervisory partition; and
storing, by the physical processor, the processor feature ID value in a hardware register accessible by the physical processor;
receiving, by the physical processor, the request originated from the quest partition for the processor feature ID value; and
in response the request, providing, by the physical processor without intervention of the supervisory partition, the requested processor feature ID value to the quest partition from the hardware register accessible by the physical processor.

2. The method of claim 1, wherein the processor feature ID value is received from the supervisory partition in conjunction with a setup operation for at least one of the guest partition, guest virtual processor, or guest virtual processor virtual trust level; and storing, by the physical processor, the received processor feature ID value.

3. The method of claim 2, wherein the setup operation of the at least one of the guest partition, guest virtual processor, or guest virtual processor virtual trust level includes at least one of a generation, instantiation, or startup of the at least one of the guest partition, guest virtual processor, or guest virtual processor virtual trust level.

4. The method of claim 1, wherein the processor feature ID value represents support of a first feature that is not natively supported by the physical processor, or a lack of support of a second feature that is natively supported by the physical processor.

5. The method of claim 1, wherein the processor feature ID value differs from a value assigned by a manufacturer of the physical processor.

6. The method of claim 1, wherein the processor feature ID value is specified for a Virtual Machine Control Structure (VMCS) or Virtual Machine Control Block (VMCB), and wherein a different processor feature ID value is specified for a different VMCS or VMCB.

7. The method of claim 1, wherein the processor feature ID value is specified for a virtual processor or virtual processor's virtual trust level context, and wherein a different processor feature ID value is specified for a different virtual processor or virtual processor's virtual trust level context.

8. A computing device, comprising:
a memory and a processor that are respectively configured to store and execute instructions, including instructions for causing the computing device to perform operations, the operations comprising:
prior to a request from software executing in a guest partition for processor feature ID information, determining by a supervisory partition, the processor feature ID information that is to be returned by the processor in response to the request from the software executing in the guest partition for the processor feature ID information; and
providing, by the supervisory partition, the determined processor feature ID information to the processor for storage by the processor in a hardware register and for later use by the processor in responding to requests from the software for the processor feature ID information from the hardware register without intervention of the supervisory partition.

9. The computing device of claim 8, wherein the operations further comprise:
storing, by the processor, the provided processor feature ID information for later use by the processor in responding to requests from the software for the processor feature ID information.

10. The computing device of claim 8, wherein the provided processor feature ID information is stored in a processor feature ID register of the processor.

11. The computing device of claim 8, wherein the operations further comprise:
receiving, by the processor, the request from the software for the processor feature ID information; and
in response the request, providing, by the processor, the requested processor feature ID information based on the processor feature ID information provided by the supervisory partition.

12. The computing device of claim 8, wherein the processor feature ID information includes a CPU ID value.

13. The computing device of claim 8, wherein the processor feature ID information includes an indication of support for at least one feature that is not natively supported by the processor or an indication of a lack of support of at least one other feature that is natively supported by the processor.

14. A method for operating a virtual machine on a computing device, comprising:
   determining, by the virtual machine executing on the computing device, that a processor feature ID value is to be obtained for use by the virtual machine;
   sending, by the virtual machine, a request for a processor feature ID to a processor of the computing device; and
   in response the request, receiving the requested processor feature ID from the processor, wherein the received processor feature ID was provided by the processor, without intervention of a supervisory partition, from information stored in a hardware register accessible to the processor, and wherein the information stored in the hardware register accessible to the processor was provided a priori to the processor by the supervisory partition.

15. The method of claim 14, wherein the requested processor feature ID is received from the processor without a virtual machine exit.

16. The method of claim 14, wherein the processor feature ID represents support of a first processor feature that is not natively supported by the processor represents a lack of support of a second processor feature that is natively supported by the processor.

17. The method of claim 14, wherein the processor feature ID is specific to at least one of the virtual machine, virtual processor, or virtual processor's trust level, and wherein a different processor feature ID is specific to another virtual machine, virtual processor, or virtual processor's trust level on the computing device.

18. The method of claim 14, wherein the processor feature ID differs from a value assigned by a manufacturer of the processor.

19. The method of claim 14, wherein the processor feature ID includes a CPU ID value.

20. The method of claim 14, wherein the processor feature ID was received in conjunction with a setup operation for at least one of the virtual machine, virtual processor, or virtual processor's trust level, and wherein the setup operation for the at least one of the virtual machine, virtual processor, or virtual processor's trust level includes at least one of a generation, instantiation, or startup of the virtual machine, virtual processor, or virtual processor's trust level.

\* \* \* \* \*